(12) United States Patent
Thomas et al.

(10) Patent No.: US 8,176,178 B2
(45) Date of Patent: May 8, 2012

(54) METHOD FOR TRACKING MACHINES ON A NETWORK USING MULTIVARIABLE FINGERPRINTING OF PASSIVELY AVAILABLE INFORMATION

(75) Inventors: Scott Thomas, Rockhampton (AU); David G. Jones, New South Wales (AT); Alisdair Faulkner, New South Wales (AU)

(73) Assignee: ThreatMETRIX Pty Ltd, Chatswood NSW (AU)

( * ) Notice: Subject to any disclaimer, the term of this patent is extended or adjusted under 35 U.S.C. 154(b) by 980 days.

(21) Appl. No.: 12/022,022

(22) Filed: Jan. 29, 2008

(65) Prior Publication Data
US 2008/0244744 A1 Oct. 2, 2008

Related U.S. Application Data

(60) Provisional application No. 60/887,049, filed on Jan. 29, 2007.

(51) Int. Cl.
*G06F 15/173* (2006.01)
(52) U.S. Cl. .......................... 709/225; 709/223; 709/224
(58) Field of Classification Search ........... 709/223–225
See application file for complete search history.

(56) References Cited

U.S. PATENT DOCUMENTS

| | | | |
|---|---|---|---|
| 6,496,824 B1 | 12/2002 | Wilf | |
| 7,398,310 B1 | 7/2008 | Kuehl et al. | |
| 7,461,120 B1 | 12/2008 | Artz, Jr. et al. | |
| 7,545,748 B1 | 6/2009 | Riddle | |
| 7,624,274 B1 | 11/2009 | Alspector et al. | |
| 7,712,134 B1* | 5/2010 | Nucci et al. .................. 726/23 |
| 2002/0066034 A1 | 5/2002 | Schlossberg et al. | |
| 2003/0140068 A1 | 7/2003 | Yeung | |
| 2003/0188189 A1 | 10/2003 | Desai et al. | |
| 2003/0223367 A1* | 12/2003 | Shay et al. ................ 370/231 |
| 2005/0076230 A1 | 4/2005 | Redenbaugh et al. | |
| 2005/0081059 A1 | 4/2005 | Bandini | |
| 2005/0187935 A1 | 8/2005 | Kumar | |
| 2005/0210027 A1 | 9/2005 | Aggarwal et al. | |
| 2006/0070128 A1 | 3/2006 | Heimerdinger et al. | |
| 2006/0080657 A1 | 4/2006 | Goodman | |
| 2006/0212942 A1 | 9/2006 | Barford et al. | |
| 2007/0011744 A1 | 1/2007 | Carothers et al. | |

(Continued)

OTHER PUBLICATIONS

Final Office Action for U.S. Appl. No. 11/550,393, date of mailing Aug. 19, 2011, 33 pages total.

(Continued)

*Primary Examiner* — Mohamed Wasel
(74) *Attorney, Agent, or Firm* — Kilpatrick Townsend and Stockton LLP

(57) ABSTRACT

A method for tracking machines on a network of computers. The method includes determining one or more assertions to be monitored by a first web site which is coupled to a network of computers. The method monitors traffic flowing to the web site through the network of computers and identifies the one or more assertions from the traffic coupled to the network of computers to determine a malicious host coupled to the network of computers. The method includes associating a first IP address and first hardware finger print to the assertions of the malicious host and storing information associated with the malicious host in one or more memories of a database. The method also includes identifying an unknown host from a second web site, determining a second IP address and second hardware finger print with the unknown host, and determining if the unknown host is the malicious host.

32 Claims, 5 Drawing Sheets

U.S. PATENT DOCUMENTS

2007/0124801 A1 5/2007 Thomas et al.
2007/0214151 A1 9/2007 Thomas et al.
2011/0305160 A1* 12/2011 Green et al. .................. 370/252

OTHER PUBLICATIONS

Final Office Action for U.S. Appl. No. 11/550,393, date of mailing Jul. 12, 2010, 27 pages total.
Final Office Action for U.S. Appl. No. 11/550,395, date of mailing Mar. 24, 2010, 19 pages total.
Non-Final Office Action for U.S. Appl. No. 11/550,395, date of mailing May 19, 2011, 35 pages total.
Non-Final Office Action for U.S. Appl. No. 11/550,393, date of mailing Mar. 3, 2011, 30 pages total.
Notice of Allowance for U.S. Appl. No. 11/550,395, date of mailing Dec. 7, 2011, 9 pages total.
Office Action of U.S. Appl. No. 11/550,393, date of mailing Oct. 6, 2009, 26 pages total.
Office Action of U.S. Appl. No. 11/550,395, date of mailing Aug. 27, 2009, 20 pages total.

* cited by examiner

METHOD FOR TRACKING MACHINES ON A NETWORK USING MULTIVARIABLE FINGERPRINTING OF PASSIVELY AVAILABLE INFORMATION

CROSS-REFERENCES TO RELATED APPLICATIONS

This application claims priority to U.S. Provisional Patent Application No. 60/887,049 filed Jan. 29, 2007, commonly assigned, incorporated here by reference for all purposes.

This application is also related to U.S. patent application Ser. No. 11/550,393 filed Oct. 17, 2006, entitles "METHOD AND SYSTEM FOR PROCESSING A STREAM OF INFORMATION FROM A COMPUTER NETWORK USING NODE BASED REPUTATION CHARACTERISTICS" and U.S. patent application Ser. No. 11/550,395 filed Oct. 17, 2006, entitled "A METHOD AND SYSTEM FOR TRACKING MACHINES ON A NETWORK USING FUZZY GUID TECHNOLOGY", commonly assigned, incorporated here by reference for all purposes.

COPYRIGHT NOTICE

All content included such as text, graphics, logos, button icons, images, audio clips, digital downloads, data compilations, and software, is the property of its supplier and protected by United States and international copyright laws. The compilation of all content is protected by U.S. and international copyright laws. Copyright© 2006 ThreatMETRIX PTY LTD. All rights reserved.

BACKGROUND OF THE INVENTION

The present invention generally relates to network monitoring techniques. More particularly, the invention provides a method and system for tracking machines on a network using fingerprinting technology. Merely by way of example, the invention has been applied to a computer network environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, spyware, web security process, electronic mail filter, any combination of these, and others.

Telecommunication techniques have been around for numerous years. In the 1990s, another significant development in the telecommunication industry occurred. People began communicating to each other by way of computers, which are coupled to the telephone lines or telephone network. These computers or workstations coupled to each other can transmit many types of information from one geographical location to another geographical location. This information can be in the form of voice, video, and data, which have been commonly termed as "multimedia." Information transmitted over the Internet or Internet "traffic" has increased dramatically in recent years. Information is now transmitted through networks, wide-area networks, telephone systems, and the Internet. This results in rapid transfer of information such as computer data, voice or other multimedia information.

Although the telecommunication industry has achieved major successes, certain drawbacks have also grown with wide spread communication networks. As merely an example, negative effects include an actor (initiator) connecting to another actor (acceptor) in a manner not acceptable to the acceptor. The inability for the acceptor to assess the risk of allowing connection from any initiator means is a problem for efficient resource management and protection of assets.

As the size and speed of these networks increase, similar growth of malicious events using telecommunications techniques: stalking, cyber-stalking, harassment, hacking, spam, computer-virus outbreaks, Denial of Service attacks, extortion, fraudulent behaviors (e.g., such as fraudulent websites, scams, 419 spam, so-called phishing) have also continued to increase. The goal of the malicious entity (Offender) is to inflict damage at minimum risk of detection or accountability. In the current realm of internet malicious activity, the offenders make use of anonymizing elements to achieve the latter. A broad range of options are available to the offender because of the current rate of compromised hosts ("Bot") on the internet.

Various methods have been proposed to detect compromised hosts. For example, prior work has been performed and published that addresses the concept of machine-based fingerprinting. For example, see
http://www.cse.ucsd.edu/users/tkohno/papers/PDF/KoBrC105PDF-lowres.pdf
These and other conventional methods have certain limitations that are described throughout the present specification and more particularly below.

From the above, it is seen that a technique for improving security over a wide area network is highly desirable.

BRIEF SUMMARY OF THE INVENTION

The present invention generally relates to network monitoring techniques. More particularly, the invention provides a method and system for tracking machines on a network using fingerprinting technology. Merely by way of example, the invention has been applied to a computer network environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, application firewall, spyware, web security process, electronic mail filter, any combination of these, and others.

According to an embodiment of the invention, a method is provided for tracking machines on a network of computers. The method includes determining one or more assertions to be monitored by a first web site which is coupled to a network of computers. The method includes monitoring traffic flowing to the web site through the network of computers and identifying the one or more assertions from the traffic coupled to the network of computers to determine a malicious host coupled to the network of computers. The method associates a first IP address and first hardware finger print to the one or more assertions of the malicious host and stores information associated with the IP address, hardware finger print, and the one or more assertions of the malicious host in one or more memories of a database. The method also includes identifying an unknown host from a second web site and determining a second IP address and second hardware finger print with the unknown host. The method then determines if the unknown host is the malicious host. In a specific embodiment, the network of computers includes a world wide network of computers. In an embodiment, the hardware fingerprint includes information associated with one or more of 'stack ticks', 'time-skew', TCP Window size, and IP address. In an embodiment, the fingerprint is formed by a fingerprinting device associated with a protected host. In another embodiment, the fingerprint is formed by a fingerprinting device associated with a stream-based host. In some embodiment, the connecting host is protected by a proxy. In those embodiments, the fingerprint may be formed by a fingerprinting device that resides on a data path between the connecting host and a protected host.

According to another embodiment of the invention, a method is provided for fingerprinting of a connecting host machine on a network. The method includes forcing the connecting host into a TCP connection mode, in which timestamps are transmitted with each packet associated with the connection. The method includes assigning a session handle to the connection. Some or all of subsequent connections that are associated with the session handle are able to exchange data with one another. The method extends a longevity of the connection, such that the longevity allows extended sampling of the host for the purposes of GUID fingerprint. The method includes sampling communication information associated with the connection, and queuing the sampled information, IP address and session handle to a correlator process. In an embodiment, the correlator process includes one or more algorithms for processing the sampled information. The method processes the sampled information, IP address and session handle to form a fingerprint for the connecting host.

In a specific embodiment of the method for fingerprinting of a connecting host machine on a network, the sampled information is associated with one or more of 'stack ticks', 'time-skew', TCP Window size, and IP address. In an embodiment, the extending of the longevity of the connection includes a tar-pitting process. For example, the extending of the longevity of the connection includes delivering requested payload data in a delayed or retarded manner and requesting repeated transmission of data and/or requests by simulating TCP data loss. In an embodiment, the correlator may be local or remote. In a specific embodiment, the one or more algorithms include linear regression, auto-correlation and support vector machines. In certain embodiment, the sampling the communication includes sampling previous host reputation on IP address. In an embodiment, the correlator process includes sample data from external sensors, using an infrastructure that aggregates and shares reputation and fingerprint data across multiple users of reputation and fingerprinting services. In a specific embodiment of the method, the correlator process incorporates the sampled measurements to normalize localized jitter, load or latency transients. In another embodiment, the correlator process includes correlating host fingerprints with an identical IP address to identify specific individual hosts. In an embodiment in which a proxy is involved, the method replaces an HTTP delivered pixel with an HTTPS delivered pixel with a suitability generated SSL certificate to force the browser to bypass the HTTP proxy. In an embodiment, the method also includes splitting data streams of HTTP and HTTPS, wherein the HTTP host fingerprint and the HTTPS host fingerprint are compared and correlated either in a single session or across multiple sessions emerging from the same initial HTTPS IP address. In an embodiment, wherein the connecting host is protected by an anonymizing proxy service, the method further includes forcing communication via a random port to retrieve data to by-pass proxy. In an embodiment, wherein the connecting host is protected by an anonymizing proxy service, the method further includes using FTP to-pass the proxy. In an embodiment, the fingerprint is formed by a fingerprinting device that resides on a data path between the connecting host and a protected host. In another embodiment, the hardware fingerprint includes information associated with one or more of 'stack ticks', 'time-skew', TCP Window size, and IP address. In certain embodiments, the fingerprint is formed by a fingerprinting device associated with a protected host. In other embodiments, the fingerprint is formed by a fingerprinting device associated with a stream-based host. In some embodiments, the connecting host is protected by a proxy, in which case, the fingerprint is formed by a fingerprinting device that resides on a data path between the connecting host and a protected host.

Various additional objects, features, and advantages of the present invention can be more fully appreciated with reference to the detailed description and accompanying drawings that follow.

DETAILED DESCRIPTION OF THE INVENTION

Figure 1:
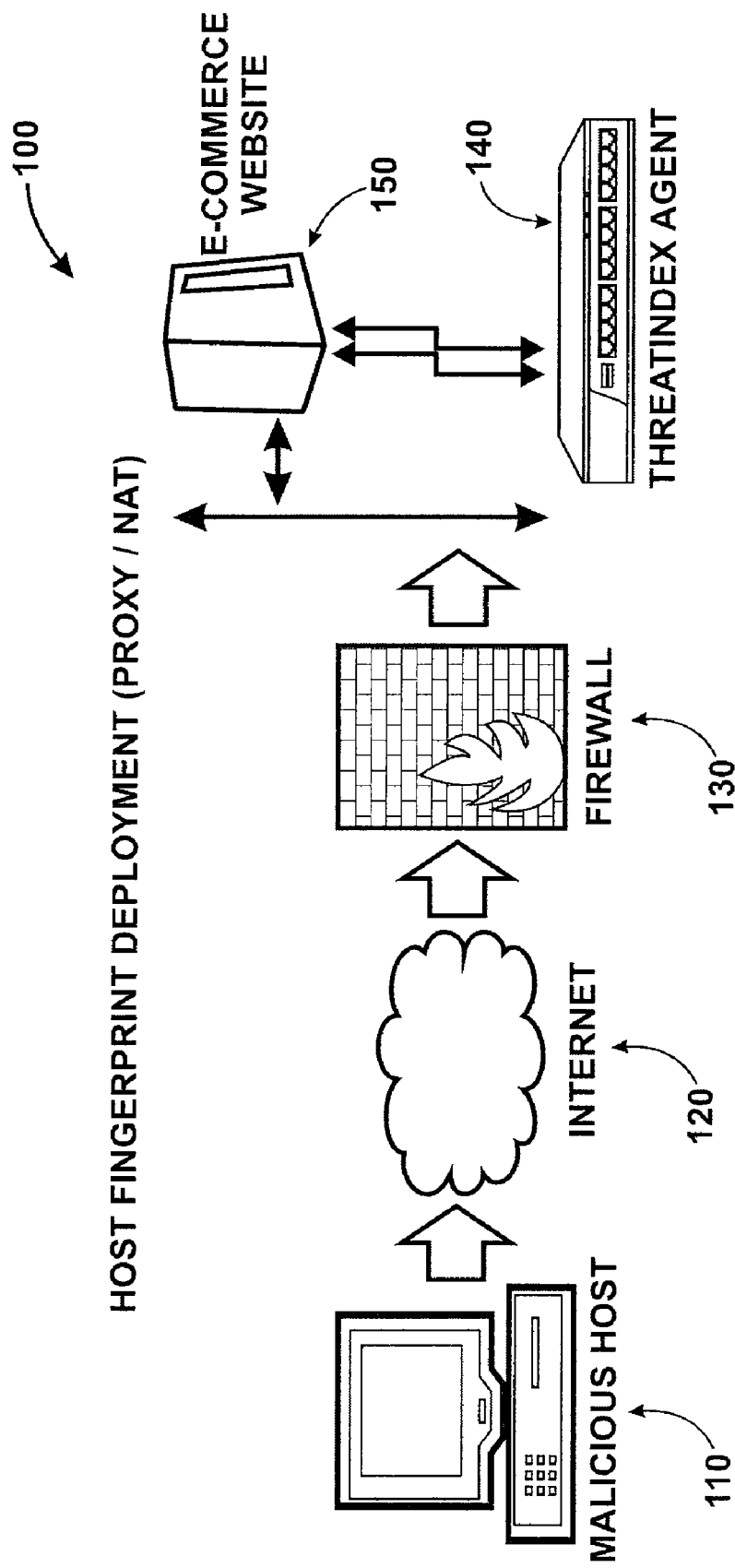
FIG. 1 is a simplified view diagram of layers in an internet transaction according to an embodiment of the present invention.

The present invention generally relates to network monitoring techniques. More particularly, the invention provides a method and system for tracking machines on a network using fingerprinting technology. Merely by way of example, the invention has been applied to a computer network environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, spyware, web security process, electronic mail filter, any combination of these, and others.

According to embodiments of the invention, many factors are considered in designing a method for tracking machines on a network. Some of these factors are discussed below.

Availability of Data—Not all operating systems immediately provide all of the necessary information for the scope of this patent. Required data may be variably implemented and is at the software developers' discretion to interpret the RFC for TCP/IP communication in their own manner whilst testing for interoperability.

Reliability of Data—Some attributes may be variable based on operating conditions. For example heat, the presence of mains or battery power to a host being 'GUID fingerprinted' may have an affect on one or more parameters. The rebooting of a host also resets stack-ticks and is therefore of only transient interest.

Network Effects—Delay and latency are similar terms that refer to the amount of time it takes a bit to be transmitted from source to destination. Jitter is delay that varies over time. One way to view latency is how long a system holds on to a packet. That system may be a single device like a router, or a complete communication system including routers and links. According to an embodiment of the invention, methods are provided to account for transient and perceived steady-state effects in the convergence to 'GUID fingerprinting'.

Evidentiary Quality—Part 1 (inaccuracy)—At the extreme end of poor evidentiary quality is the concept of false positive and maliciously inaccurate sensor reports. In an embodiment, the invention provides a method to allow 'acceptance of false positives' in context of supporting evidence. The practical application of this is that some data is unreliable (as stated above) but can be accepted as a source for correlation which supports convergence.

Evidentiary Quality—Part 2 (spoofability or spoof susceptibility)—Conventional methods may assert that a single detection is adequate, the equivalent of a DNA fingerprint that is not "spoofable" or forgeable at detection time. This panacea may be probable but no known method has been proven "un-spoofable". In the situation of Bots, where the hosts is compromised by code (often at the kernel level), the machine and DNA are potentially under control of the Offender or Intermediary and as such, the attributes later many potentially be also under their control. For example, MAC address or clock-skew are modifiable if kernel control has been surrendered. Multiple failings of this technique are discussed the in the public domain at these sites.

http://www.cloppert.org/blog/2005_03_01_archive.html
http://it.slashdot.org/it/05/03/04/1355253.shtml?tid=172&tid=158

The table below lists examples of host action and host attribute.

|  | Host attributed not spoofed | Host attributed spoofed |
| --- | --- | --- |
| Host Action - Good | High evidentiary quality | Low evidentiary quality |
| Host Action - Malicious | High evidentiary quality | Low evidentiary quality |

According to embodiments of the invention, methods are provided to counter the possible exploitation of one or more attributes by a malicious entity.

According to embodiments of the present invention, some malicious individuals may visit a website and use less sophisticated methods to hide their presence (such as NAT, proxies, anonymizers and Tor/onion networks). In an embodiment, the invention provides a method of tracking and identifying the responsible host—we will call this 'GUID fingerprinting'.

In a specific embodiment, the invention provides a method for detection and tracking of hosts where openly available information such as IP addresses and cookies are less effective, where the hosts may be attempting to hide its existence deliberately or by a number of network side-effects such as corporate or ISP network design.

In certain embodiment of the invention, methods are provided that are applicable to TCP or other session oriented transactions where there is a bi-directional communication between two or more hosts.

In an embodiment, the invention provides a method for tracking machines on a network using available attributes via the TCP/IP communications infrastructure for some common internet activities that are difficult to discern malicious from normal behavior. Sometimes this is referred to as 'low and slow' attack, where 'low' is used as an analogy to a plane flying beneath the radar so as to avoid detection. In a specific embodiment, a method is provided that improves tracking of machines by making use of sampled and derived attributes based on IP (including UDP, TCP/IP and HTTP and other) such as 'stack ticks', 'time-skew', TCP Window size, Operating System, Port Number, Port Listening Status, IP Address, TCP Sequence Number, Maximum Transmission Unit, Connection Speed, Geolocation and ISP, in combination with attributes collected using javascript, flash, HTML, Content Style Sheet or other browser-based methods including Local Storage Object, first party Browser Cookie, third party Browser Cookie, Browser user agent string, Screen Resolution, Screen DPI, PC Start Time, Local Time, Clock-Offset, Clock-Drift, PC Time Zone, Browser Plugins, Enabled and Disabled Browser functions, Browser Document Object Model, Operating System, and Listening, Open and Closed Sockets.

In another embodiment of the invention, a method is provided for applying a combination of host fingerprinting with IP information to aid in the countering of zombie, BotNet, malicious and compromised hosts. This can be applied with increased accuracy in determining reputation or trust measurements for network hosts that may be engaging in malicious activity.

In an embodiment of the invention, methods are provided for forcing host data collection, data triangulation, correlation methods and proxy mitigation. In an embodiment, the invention provides techniques for driving accuracy in the fingerprinting processes. Embodiments of the invention can be applied to malicious host tracking, particularly zombie or BotNet computers that are used without the knowledge of the owner. According to embodiments of the invention, techniques are provided for increasing the accuracy of the fingerprinting, including several strategies and implementation methods that extend the above.

Depending upon the embodiment, the present invention includes various features, which may be used. These features include the following:

1. That the application of host Globally Unique Identifier (GUID) fingerprinting may be used for tracking potentially malicious hosts that are primarily physically static and remain bonded to a specific ISP or connection provider for access to a network (internet).

2. That applying a combination 'stack ticks', 'time-skew', TCP Window size and IP address are increase effective method of tracking hosts and formulating a GUID fingerprint.

3. That the use of multiple sensors provides a method of increasing the accuracy of the fingerprint described above. This can be thought of as a triangulation or correlation method to converge on a specific GUID fingerprint.

4. One method for implementing multiple sensors to increase accuracy by the use of one or more moderately fixed reference points for the purposes of removing latency, jitter and other transient network effects.

5. A specific class of algorithms that are applied in processes 3 and 4 in delivering the converged GUI fingerprint.

6. That the application may also be applied to tracking and detecting hosts that are used for a multitude of fraudulent hosting sites with varied entity names, DNS names or IP addresses. This is a method of reusing a single physical host to conduct activity under many guises or pseudonyms.

7. A method for enabling the process 1 and process 2 when the host resides behind a firewall or network translation device (NAT).

8. A method for enabling the process 1 and process 2 when the host resides behind a HTTP proxy and the communication is initially HTTP.

9. A method where hosts that act intermediaries or relays in certain 'store-and-forward' communications are able to implement previous claims. Such hosts may be (but not limited to) IRC, Instant Messaging, search, advertising or affiliate network members, VOIP switches or e-mail based communication.

10. A method where network devices that are switching, routing, bridging, or gateway devices are able to implement previous claims.

11. A method where a passive 'stand-aside' network device may modify the stream of network traffic and is able to implement previous claims. (man in the middle).

12. A method for detection of a "man-in-the-middle" attack can be applied by determining a different host fingerprint is apparent through the course of a transaction (or group of transactions).

13. A method for identification of users emerging from Tor/Onion networks or where there is increased sophistication used by the originator to protect their identity.

As shown, the above features may be in one or more of the embodiments to follow. These features are merely examples, which should not unduly limit the scope of the claims herein. One of ordinary skill in the art would recognize many variations, modifications, and alternatives.

According to an embodiment of the invention, a method is provided for tracking machines when both malicious hosts and normal visitors visit a site and conduct activities. For example, the site may be provided by an HTTP/Web server. Each host arriving is GUID fingerprinted so that the identity of the host can be re-established on return visits. In an embodiment, the method for tracking a host includes assigning a 'reputation' or 'trust-rating' for the host that may be used as a risk-management mechanism in certain transactions on the website. Such activities as payment processing, account registration, account login, entering/publishing of data may be points where a host (and the Offender controlling the host) can perform fraudulent, malicious or nuisance transactions.

FIG. 1 is a simplified diagram for host fingerprint deployment according to an embodiment of the invention. This diagram is merely an example, which should not unduly limit the scope of the claims herein. One of ordinary skill in the art would recognize other variations, modifications, and alternatives. As shown, FIG. 1 includes a malicious host 110, Internet 120, a firewall 130, a website 140 and a fingerprint system 150 such as a ThreatINDEX Agent.

Figure 2:
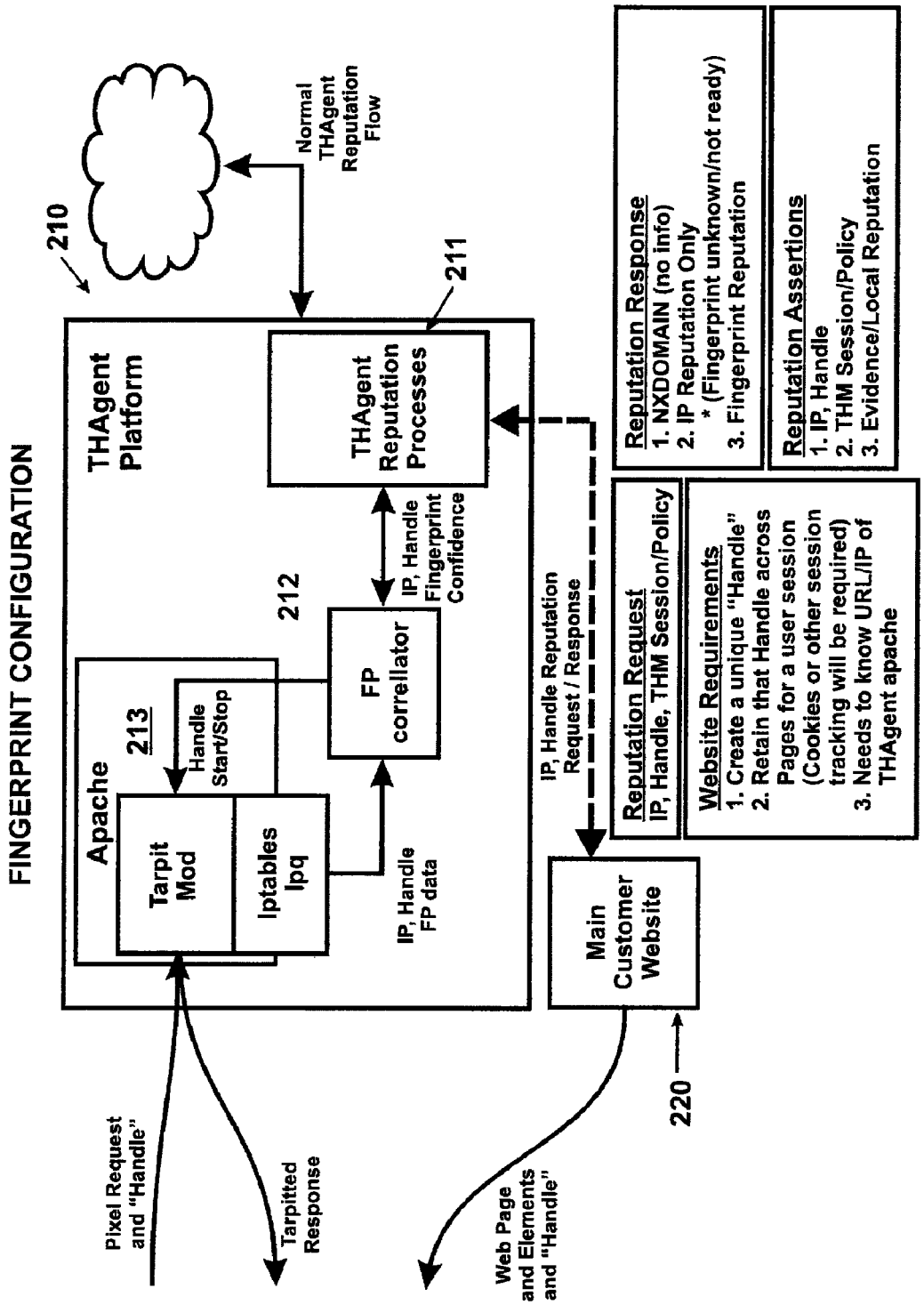
FIG. 2 is a simplified diagram of a method for evidence gathering according to an embodiment of the present invention.

FIG. 2 is a simplified diagram of a configuration for a fingerprint system 200 according to an embodiment of the present invention. This diagram is merely an example, which should not unduly limit the scope of the claims herein. One of ordinary skill in the art would recognize other variations, modifications, and alternatives. As shown, system 200 includes a platform 210. As an example, platform 210 can be a THAgent Platform by ThreatMETRIX PTY LTD. As shown, platform 210 includes one or more reputation processors 211, a fingerprint correlator 212, and a web server system 213, such as an Apache web server. The reputation processor 211 is coupled to a main customer website 220. The information exchange between reputation processor and the customer website includes Reputation Request, Reputation Response, and Reputation Assertions. In an embodiment, Reputation Assertions can include, for example, the following:

1. IP Address, Session Handle;
2. Session/Policy; and
3. Evidence/Local Reputation.

Although the above has been illustrated in terms of specific system features, it would be recognized that many variations, alternatives, and modifications can exist. For example, any of the system features can be further combined, or even separated. The features can also be implemented, in part, through software or a combination of hardware and software. The hardware and software can be further integrated or less integrated depending upon the application. Further details of certain methods according to the present invention can be found throughout the present specification and more particularly below.

Figure 3:
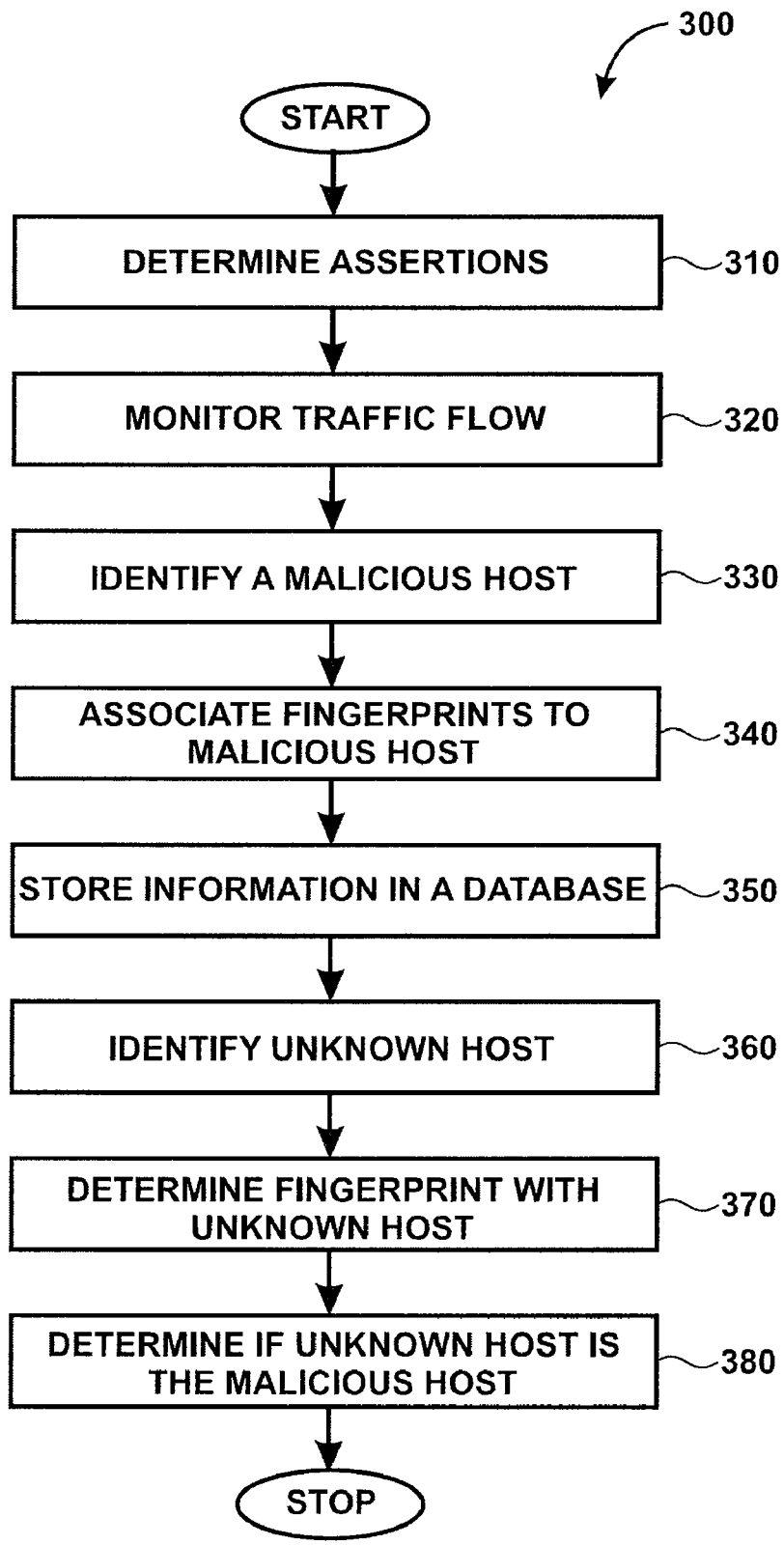
FIG. 3 is a simplified diagram of a method for evidence processing according to an embodiment of the present invention.

Referring to FIG. 2, a method tracking machines on a network of computers according to an embodiment of the invention can be briefly described in a flowchart diagram in FIG. 3 and outlined below. FIG. 3 is a simplified flowchart diagram for a method for tracking machines on a network according to an embodiment of the invention. This diagram is merely an example, which should not unduly limit the scope of the claims herein. One of ordinary skill in the art would recognize other variations, modifications, and alternatives. As shown, the method includes the following processes.

1. (Process 310) Determine one or more assertions to be monitored by a first web site, the first web site being coupled to a network of computers;
2. (Process 320) Monitor traffic flowing to the web site through the network of computers;
3. (Process 330) Identify the one or more assertions from the traffic coupled to the network of computers to determine a malicious host coupled to the network of computers;
4. (Process 340) Associate a first IP address and first hardware finger print to the one or more assertions of the malicious host;
5. (Process 350) Store information associated with the IP address, hardware finger print, and the one or more assertions of the malicious host in one or more memories of a database;
6. (Process 360) Identify an unknown host from a second web site;
7. (Process 360) Determine a second IP address and second hardware finger print with the unknown host; and
8. (Process 370) Determine if the unknown host is the malicious host.

In a specific embodiment, the network of computers includes a world wide network of computers. In an embodiment, the hardware fingerprint includes information associated with one or more attributes including 'stack ticks', 'time-skew', TCP Window size, and IP address. In an embodiment, the fingerprint is formed by a fingerprinting device associated with a protected host. In another embodiment, the fingerprint is formed by a fingerprinting device associated with a stream-based host. In some embodiment, the connecting host is protected by a proxy. In those embodiments, the fingerprint may be formed by a fingerprinting device that resides on a data path between the connecting host and a protected host.

The above sequence of steps provides a method for tracking a machine visiting a website according to an embodiment of the present invention. As shown, the method uses a combination of steps including a way of using IP address and fingerprint to track machines on a network. Other alternatives can also be provided where steps are added, one or more steps are removed, or one or more steps are provided in a different sequence without departing from the scope of the claims herein. Further details of the present method can be found throughout the present specification and more particularly below.

A method for machine tracking a host visiting a website on a network according to an embodiment of the invention can be briefly outlined below.

Step 1: A host arrives at a website. There is a TCP/IP connection of the host to the website server ("server"). At the time of arrival, the host retrieved various components (pages, images etc) from the server.

Step 2: The server or a supporting device (which will be called the 'fingerprinter') commences to gather information about the arriving host, assign a "session handle" and develop a GUID fingerprint. In a specific embodiment, the method includes instructing the browser to retrieve a 'pixel', Content Style Sheet element, javascript, flash or other HTML element from the "fingerprinter". An example of the configuration is illustrated in FIG. 2.

Step 3: Once the GUID fingerprint is stored in a database, the host activities are monitored on the site.

Step 4: If the host conducts malicious activity on the site, the database is updated to report and retain evidence of this activity. This activity may affect the host's 'reputation'.

Step 5: Optionally, the GUID fingerprint, reports of activity and reputation may be shared with other parties or websites via a shared or 'global' database.

Step 6: This website (or other sites which have received a trustworthy report of the reputation of this host) may on occasion of future visits respond differently in accordance with the newly updated host reputation. For example, if a host is considered untrustworthy, increased monitoring or rejection of specific transactions would be a possible response.

The above sequence of steps provides a method for tracking a machine visiting a website according to an embodiment of the present invention. As shown, the method uses a combination of steps including a way of assigning a "session handle" and developing a GUID fingerprint. Other alternatives can also be provided where steps are added, one or more steps are removed, or one or more steps are provided in a different sequence without departing from the scope of the claims herein. Further details of the present method can be found throughout the present specification and more particularly below.

A method for GUID fingerprinting according to an embodiment of the invention include the following processes.

In a specific embodiment, the 'fingerprinter' ensures or attempts to force the connecting host into a TCP connection mode, where timestamps are transmitted with each packet associated with the connection.

In an embodiment, for the continuation of the connection, a connection is assigned a "session handle." Some or all of subsequent connections that all have the same related "session handle" may also exchange data in a similar manner.

In an embodiment, the 'fingerprinter' ensures there is adequate connection activity to establish a significant sample of the host for the purposes of GUID fingerprint. A method of achieving this is to extend the longevity of one or more connections. A method for extending the longevity of a network connection includes manipulating the communication by a method of 'tar-pitting'.

Figure 4:
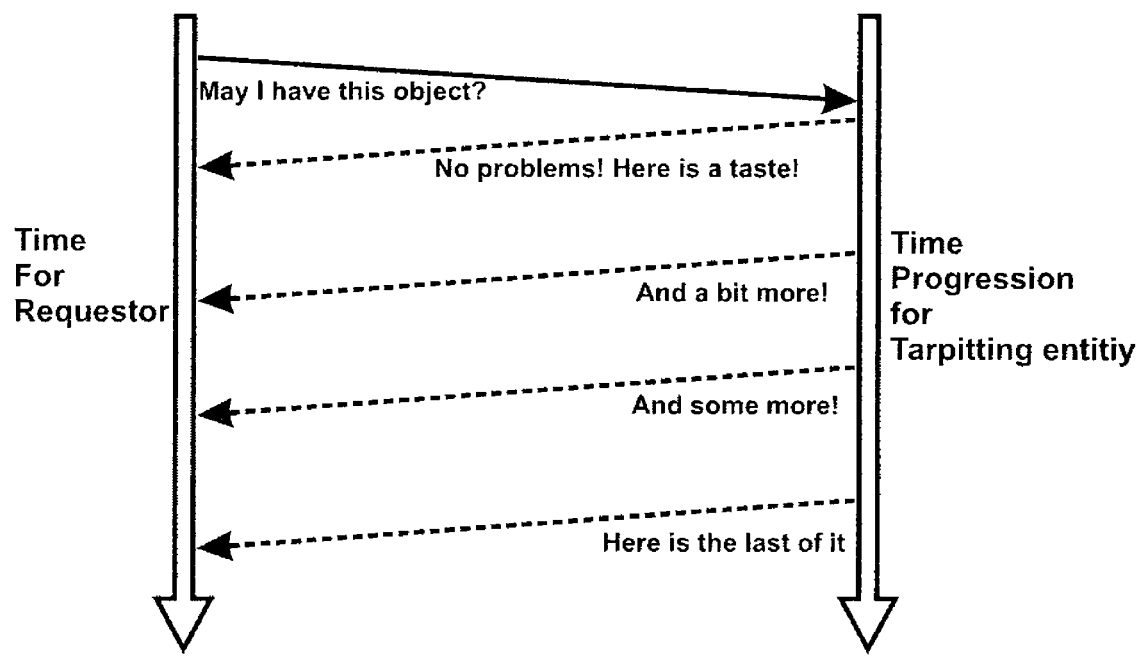
FIG. 4 is a simplified flow diagram of a method for tracking machines on a network of computers according to an embodiment of the present invention.

FIG. 4 is a simplified view diagram illustrating a method for extending longevity of network connection according to an embodiment of the invention. This diagram is merely an example, which should not unduly limit the scope of the claims herein. One of ordinary skill in the art would recognize other variations, modifications, and alternatives. As shown, the method includes a process of by "tar-pitting." In a specific embodiment, the method includes the following:

i. Delivering requested payload data in a delayed or retarded manner.

ii. Requesting repeated transmission of data and/or requests by simulating TCP data loss.

Of course, there can be other variations, modifications, and alternatives.

According to an embodiment of the invention, a method for fingerprinting includes sampling certain fingerprint attributes associated with the communication and queuing the samples, IP address and "session handle" to a "correlator" process that may be local or remote.

In an embodiment, the "correlator" process includes one or more algorithms to converge results from the sampled fingerprint attributes to form a fingerprint for the connecting host. Examples of fingerprint attributes include 'stack ticks', 'time-skew', TCP Window size, Maximum Transmission Unity, Connection Speed, HTTP Header fields and IP address, etc. Examples of algorithms and methods include but are not limited to linear regression, auto-correlation and support vector machines as well as well known policy and rule-matching techniques. The specific use of previous host reputation on IP address and other attributes may be used to accelerate convergence. This is an example of a more generalized method of the correlator process incorporating additional sample data from external sensors. This can be achieved via an infrastructure that aggregates and shares reputation and fingerprint data across multiple users of the reputation and fingerprinting services.

Figure 5:
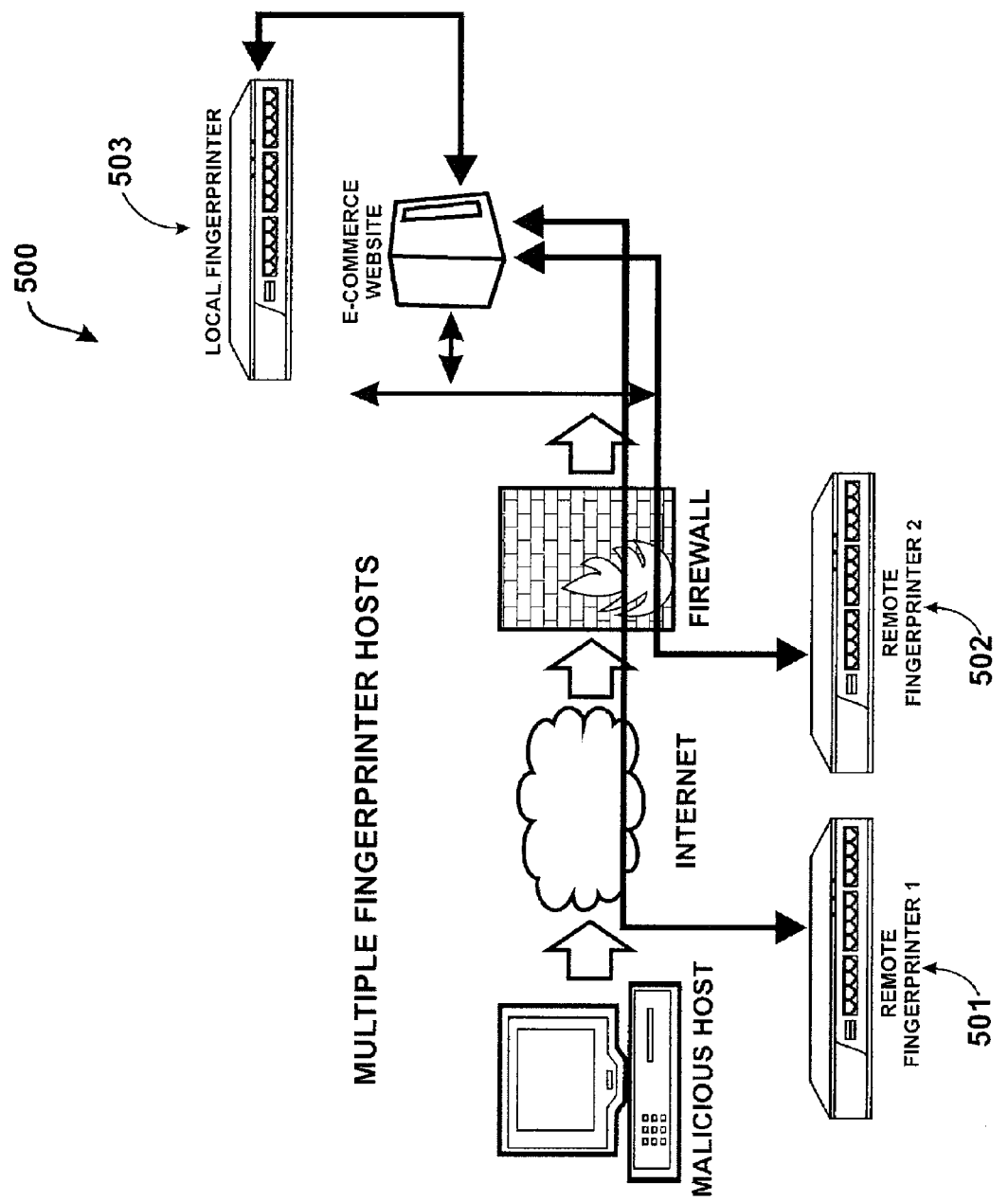
FIG. 5 is a simplified flow diagram of a method for querying a knowledgebase of malicious hosts according to an embodiment of the present invention.

FIG. 5 is a simplified diagram of a method for tracking machines on a network using multiple fingerprinter hosts according to an embodiment of the invention. This diagram is merely an example, which should not unduly limit the scope of the claims herein. One of ordinary skill in the art would recognize other variations, modifications, and alternatives. In a specific embodiment, the eCommerce website may instruct the browser to retrieve a 'pixel', CSS, HTML, javascript or flash from several "fingerprinter" hosts. In the example shown in FIG. 3, the fingerprinter hosts are designated s Remote Fingerprinter 1 (501), Remote Fingerprinter 2 (502), and Local Fingerprinter (503), etc. These hosts may be located at specifically selected and topologically located places on the network (or internet) that provide (within some tolerance) consistent metrics and measurements. The correlator process may then incorporate these measurements as a method of normalizing any localized jitter, load or latency transients.

In a specific embodiment, where multiple hosts are associated with a single IP address, the fingerprinting methods discussed above may be correlated. All host fingerprints with the same IP address can be correlated to identify specific individual hosts. This may also be combined or independent of other methods In another embodiment of the invention, a method is provided for fingerprinting in the case of connections that are detected or suspected to be "proxied" (passing through a proxy connection that is retransmitting packets on behalf of the originator or possibly even a chain of proxies). Although a proxy fully retransmits all payload data and can invalidate certain fingerprinting methods, the present invention outlines methods for by-passing these proxies or detecting anomalies that would indicate the presence of a proxy.

In an embodiment, the invention provides a method for replacement of a HTTP delivered pixel with an HTTPS delivered pixel (with a suitability generated SSL certificate) to force the browser to bypass the HTTP proxy. Using this method, the deployment scenario illustrated in FIG. 1 or FIG. 3 is still applicable. It should be noted this method is not guaranteed to work where the user's machine has been configured for HTTPS proxy.

As discussed above, it is possible to force a method where data streams of HTTP and HTTPS can be split. In this situation, the HTTP host fingerprint and the HTTPS host fingerprint can be compared and correlated either in a single session or across multiple sessions emerging from the same initial HTTPS IP address.

According to another embodiment of the invention, a method is provided for fingerprinting a connecting host that is protected by an anonymous proxy. For example, Tor, Onion, or other anonymizing services exist on the internet to afford the user a means of privacy protection in regard to their IP address. The authors acknowledge the value of these services and also note that many who operate such services use certain measures to mitigate or control the number of hacker activities utilizing the service. In some embodiments, the invention provides methods in order to provide additional protection from such activities.

i. In an embodiment, the extrusion points of these networks are far more (a) static and (b) small in number, than compromised hosts and are therefore easily tracked using existing IP reputation methods described throughout the application. The method for extrusion point detection is to regularly subscribe to these services and record the extrusion points.

ii. In another embodiment, communication may be forced via server side HTML to use a TCP port not serviced for HTTP, HTTPS. For example the use of a random port to retrieve data may by-pass proxy. Similarly FTP may by-pass such proxies. Where proxy-bypass is successful, the IP Address of the communication will differ from the IP Address presented by the proxy.

iii. In another embodiment, communication may be forced via service side HTML to bypass proxy settings as defined by the browser. For example the browser is caused to request a media file via the Real Time Streaming Protocol supported by many popular media players of the time. Yet another example of the method is to cause objects requested by the browser to initiate a connection back to the 'fingerprinter' and ignoring the proxy configuration in the browser. Where the method is successful, the IP Address of the communication will differ from the IP Address presented by the proxy.

iv. In another embodiment, anomalies are detected between attributes collected from the client and attributes determined from the connecting host's protocol stream. One such example is detecting that the operating system determined from the browser agent string based on using one or more of javascript, flash, pixel or Content Style Sheet element is inconsistent with the operating system specific implementation of the TCP protocol of the connecting host. An example of an operating specific implementation of the TCP protocol is the rate of change between network stack 'ticks' as described by the timestamps feature in the TCP extensions for high performance RFC1323. Yet another example is the detection of inconsistencies between the time-zone measured using javascript or flash downloaded by the client, and the time-zone of the connecting host as implied by the geo-location of the connecting host's IP Address.

v. In another embodiment, the presence of a proxy is determined based on anomalies detected in HTML that are, or are not, successfully requested by the client from the 'fingerprinter' Many proxies are configured to minimize the amount of information about the client that can be leaked to a server in order to preserve anonymity. One such example is that many commercial proxies or open source CGI proxies will automatically filter 1*1 pixels, commonly known as web-bugs, which are used in a similar fashion as traditional browser cookies for tracking clients. Further this example makes use of both an encoded and an un-encoded pixel, wherein the method of encoding is understood by the browser but not by the proxy filter and hence one pixel is filtered and the other is not, indicating the likely presence of an intermediary filter device. One such example of encoding is to use Content Style Sheet elements to embed the pixel as a transparent background of an element.

vi. In another embodiment, the presence of a proxy is determined based on inconsistencies between the geolocation of the connecting host IP Address and the geolocation of the client's DNS server IP Address using the following steps vi.i The connecting host requests a HTML page from the 'fingerprinter' that contains a unique hostname as part of a URL that has been uniquely generated for that connecting host. The host name has two characteristics 1) it contains a unique string that can be uniquely matched to the session id or session handle 2) it belongs to an authorative server which is accessible or on the 'fingerprinter'.

vi.ii A DNS response is normally cached by a client, however, because the host name is unique and the server can control how long the client will cache each response, the client DNS will need to resend the DNS request each time it wishes to access the IP Address for the unique host name.

vi.iii The 'fingerprinter', which may include a DNS server, accesses the attributes of the client's forwarded DNS request packet and determines the IP Address of the originating client DNS server.

vi.iv The geolocation of the clients IP Address is then compared to the geolocation of the connecting host IP Address to determine if they are in a reasonable vicinity. For example, if determined not to be from the same country then this would indicate the use of a proxy.

According to another embodiment of the invention, a method is provided for tracking machines on a network including proxy configuration for stream-based communications. In this scenario both malicious hosts and normal visitors transfer data via stream. Protocols that are typical (but not limited to) are: FTP, SMTP, IRC, Instant Messaging, VOIP communication. The method can be briefly outlined below.

Step 1: A host attempts to commence a communication with a stream-based service. The connection is established via an inbound proxy host that either transparently bridges or routes the data to the host delivering the service.

Step 2: The bridging or routing device (which will be called the 'fingerprinter') commences to gather information about the initiating host, assign a "session handle" and develop a GUID fingerprint.

Step 3: Once the GUID fingerprint is stored in a database and the hosts transmissions and other activities are monitored.

Step 4: If the host conducts malicious activity, the database is updated to report and retain evidence of this activity. This activity may affect the hosts 'reputation'.

Step 5: Optionally, the GUID fingerprint, reports of activity and reputation may be shared with other parties or service providers via a shared or 'global' database.

Step 6: This service (or other sites who have received a trustworthy report of the reputation of this host) may on occasion of future visits respond differently in accordance with the newly updated host reputation.

The above sequence of steps provides a method for tracking a machine on a network including proxy configuration for stream-based communications according to an embodiment of the invention. As shown, the method uses a combination of steps including a way of using an inbound proxy host that either transparently bridges or routes the data to the host delivering the service. Other alternatives can also be provided where steps are added, one or more steps are removed, or one or more steps are provided in a different sequence without departing from the scope of the claims herein. Further details of the present method can be found throughout the present specification and more particularly below.

According to an alternative embodiment of the invention, a method is provided for tracking machines on a network using bridge or router techniques. In this scenario both malicious hosts and normal visitors transfer data via stream. Protocols that are typical (but not limited to) are: FTP, SMTP, IRC, Instant Messaging, VOIP communication. The method can be briefly outlined below. This situation is identical to described above with reference to a proxy configuration. However, the device described as a proxy is replaced with a device that operates transparently at a lower level in the TCP/IP communication. The host behaves as a normal bridge or router network device except for the Steps 1-6 described in Method B.

Step 1: A host attempts to commence a communication with a stream-based service. The connection is established via an inbound device that either transparently bridges or routes the data to the host delivering the service. In an embodiment, the inbound device operates transparently at a lower level in the TCP/IP communication. For example, the inbound device can be a bridge or router network device that is configured to be a fingerprinter.

Step 2: The 'fingerprinter' commences to gather information about the initiating host, assign a "session handle" and develop a GUID fingerprint.

Step 3: Once the GUID fingerprint is stored in a database and the hosts transmissions and other activities are monitored.

Step 4: If the host conducts malicious activity, the database is updated to report and retain evidence of this activity. This activity may affect the hosts 'reputation'.

Step 5: Optionally, the GUID fingerprint, reports of activity and reputation may be shared with other parties or service providers via a shared or 'global' database.

Step 6: This service (or other sites who have received a trustworthy report of the reputation of this host) may on occasion of future visits respond differently in accordance with the newly updated host reputation.

The above sequence of steps provides a method for tracking a machine on a network including proxy configuration for stream-based communications according to an embodiment of the invention. As shown, the method uses a combination of steps including a way of using an inbound device, such as a bridge or a router network device, that either transparently bridges or routes the data to the host delivering the service. Other alternatives can also be provided where steps are added, one or more steps are removed, or one or more steps are provided in a different sequence without departing from the scope of the claims herein. Further details of the present method can be found throughout the present specification.

According to yet another embodiment, the invention provides a "man-in-the-middle" method that includes a "fingerprinting device" that is able to influence and measure communication activities for the purposes of fingerprinting. In an embodiment, the fingerprinting device resides on the data path between the "visiting host" and the "protected host". The method can be briefly outlined below.

Step 1: At specific times of establishment of communication from the visiting host to the protected hosts initiates a communication from the "fingerprinting device". In a specific embodiment, during the TCP session establishment, the "fingerprinting device" replies in a manner that "spoofs" a response to the "visiting host" before the "protected host"s packets. The latter's packets are ignored and the TCP session is established in the manner required for fingerprinting.

In Steps 2-6 to below, the "fingerprinting device" gathers the required data by passively sniffing the appropriate traffic elements.

Step 2: The 'fingerprinting device' commences to gather information about the initiating host, assign a "session handle" and develop a GUID fingerprint.

Step 3: Once the GUID fingerprint is stored in a database and the hosts transmissions and other activities are monitored.

Step 4: If the host conducts malicious activity, the database is updated to report and retain evidence of this activity. This activity may affect the hosts 'reputation'.

Step 5: Optionally, the GUID fingerprint, reports of activity and reputation may be shared with other parties or service providers via a shared or 'global' database.

Step 6: This service (or other sites who have received a trustworthy report of the reputation of this host) may on occasion of future visits respond differently in accordance with the newly updated host reputation.

The above sequence of steps provides a method for tracking a machine on a network including proxy configuration for stream-based communications according to an embodiment of the invention. As shown, the method uses a combination of steps including a way of using a "fingerprinting device" that is able to influence and measure communication activities for the purposes of fingerprinting. This specific method is well suited to long running sessions where TCP session initiation is a small fraction of the overall communication volume. Other alternatives can also be provided where steps are added, one or more steps are removed, or one or more steps are provided in a different sequence without departing from the scope of the claims herein. Further details of the present method can be found throughout the present specification.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for fingerprinting a connecting host machine on a network, the method comprising:
   forcing the connecting host into a TCP connection, wherein timestamps are transmitted with each packet associated with the connection;
   assigning a session handle to the connection, some or all of subsequent connections that are associated with the session handle being able to exchange data with one another;
   extending a longevity of the connection, the longevity allowing extended sampling of the host for the purposes of fingerprinting;
   sampling attributes associated with the connection;
   queuing the sampled attributes, IP address, and session handle to a correlator process, the correlator process including one or more algorithms for processing the sampled attributes;
   processing the sampled attributes, IP address, and session handle; and
   forming a fingerprint for the connecting host.

2. The method of claim 1 wherein the sampled attributes are associated with one or more of 'stack ticks', 'time-skew', TCP Window size, and IP address.

3. The method of claim 1 wherein the sampled attributes further include remote determination of one or more of ISP, Local Storage Object, first Party Browser Cookie, third Party Browser Cookie., TCP IP Address, HTTP IP Address, HTTPS IP Address, RTSP IP Address, RTP IP Address, FTP IP Address, DNS name server, Maximum Transmission Unit, Connection Type, Connection Speed, Bogon Hijack Address, Static/ Dynamic Address, Proxy Address, TCP Sequence Number, Browser string, Screen Resolution, Screen DPI, PC Start Time, HTTP Header information, Local Time, Clock- Offset, TCP-Time Stamp, TCP stack-tick, Clock-Drift, Time Zone, Browser Plugins, Enabled and Disabled Browser functions, Browser Document Object Model, Operating System, and Listening, Open and Closed Sockets or other available or derivable information.

4. The method of claim 1 wherein the extending of the longevity of the connection includes a tar-pitting process.

5. The method of claim 4 wherein the extending of the longevity of the connection includes:
  delivering requested payload data in a delayed or retarded manner; and
  requesting repeated transmission of data and/or requests by simulating TCP data loss.

6. The method of claim 1 wherein the correlator may be local or remote.

7. The method of claim 1 wherein the one or more algorithms include linear regression, auto-correlation and, vector machines.

8. The method of claim 1 wherein one or more algorithms may include a rule-matching strategy.

9. The method of claim 1 wherein the sampling of the communication includes sampling previous host reputation on IP address.

10. The method of claim 1 wherein the correlator process includes sampling data from external sensors, using an infrastructure that aggregates and shares reputation, and fingerprint data across multiple users of reputation and fingerprinting services.

11. The method of claim 1 wherein correlator process incorporates the sampled measurements to normalize localized jitter, load, or latency transients.

12. The method of claim 1 wherein the correlator process includes correlating host fingerprints with an identical IP address to determine specific individual hosts.

13. The method of claim 1 wherein the connecting host is an anonymizing proxy or intermediate device, forcing a connection to bypass the proxy or intermediate device.

14. The method of claim 13, further comprising replacing an HTTP delivered pixel with an HTTPS delivered pixel with a suitability generated SSL certificate to force the browser to bypass the HTTP proxy.

15. The method of claim 13, further comprising forcing communication via a random port to retrieve data to by-pass a HTTP proxy.

16. The method of claim 13 wherein the connecting host is an anonymizing proxy or intermediate device, the method further including using FTP to bypass a HTTP proxy.

17. The method of claim 13 wherein the connecting host is an anonymizing proxy or intermediate device, the method further including forcing a connection via the Real Time Streaming Protocol (RTSP) connection to retrieve data to by-pass the HTTP proxy.

18. The method of claim 13 wherein an object in the browser, including but not limited to java or flash object is configured to bypass default proxy settings of a browser when performing a connect back to the fingerprinting device.

19. The method of claim 13 wherein the connecting host is made to perform a connection on any protocol or embedded object that does not make use of default proxy settings of a browser.

20. The method of claim 1 wherein the connecting host is an anonymizing proxy or intermediate device, detecting inconsistencies between attributes in the TCP protocol from the connecting host and attributes measured from the client.

21. The method of claim 20 one such embodiment being determining inconsistencies in operating systems based on the known increment in the connecting host's TCP timestamp for that operating system and comparing it to the operating system as declared in the browser agent string measured from the client.

22. The method of claim 20 one such embodiment comprising deriving valid time zones based on the geolocation of the connecting host IP Address and comparing the time-zones to the time-zone as measured using javascript or flash active script on the client.

23. The method of claim 1 wherein the connecting host is an anonymizing proxy or intermediate device, detecting distortion or loss of information as it is transmitted through that device.

24. The method of claim 23 one such embodiment including detecting that a served "x" by "y" pixels image was not downloaded by the connecting host and determining that the connecting host is capable of rendering image files by serving an obfuscated image in a Content Style Sheet (CSS) element, where x and y are integer numbers.

25. The method of claim 1 wherein the connecting host is an anonymizing proxy or intermediate device, measuring inconsistencies in Geolocation of the connecting host IP Address and the IP Address of the DNS name server accessed by the client.

26. The method of claim 25 wherein the connecting host is caused to request a resource on a unique domain name meaning the domain name is different for each visit which will force the client's DNS server to connect to the domain owner's DNS server which the fingerprinting device has access to.

27. The method of claim 25, further comparing the geolocation of the IP Address of the client's DNS name server with the geolocation of IP Address of the connecting host.

28. The method of claim 1 wherein the fingerprint is formed by a fingerprinting device that resides on a data path between the connecting host and a protected host.

29. The method of claim 1 wherein the network of computers includes a world wide network of computers.

30. The method of claim 1 wherein the fingerprint is formed by a fingerprinting device associated with a protected host.

31. The method of claim 1 wherein the connecting host is protected by a proxy.

32. The method of claim 1 wherein the fingerprint comprises device fingerprint.

* * * * *